(12) United States Patent
Holden (10) Patent No.: US 8,917,807 B1
(45) Date of Patent: Dec. 23, 2014

(54) SPECIAL THORIUM-PLUTONIUM HYDRIDES FOR FAST TREATMENT REACTOR

(76) Inventor: Charles S. Holden, San Francisco, CA (US)

( * ) Notice: Subject to any disclaimer, the term of this patent is extended or adjusted under 35 U.S.C. 154(b) by 1161 days.

(21) Appl. No.: 12/704,456

(22) Filed: Feb. 11, 2010

Related U.S. Application Data

(60) Provisional application No. 61/151,816, filed on Feb. 11, 2009.

(51) Int. Cl.
G21G 1/06 (2006.01)
G21C 3/60 (2006.01)
G21G 1/02 (2006.01)

(52) U.S. Cl.
CPC ... *G21C 3/60* (2013.01); *G21G 1/02* (2013.01)
USPC ........... 376/182; 376/156; 376/158; 376/170; 376/171; 376/172

(58) Field of Classification Search
CPC ............. G21C 1/00; G21C 1/04; G21C 3/00; G21C 3/42; G21C 3/58; G21C 3/60; G21G 1/02
USPC ................................... 376/156, 158, 170–172
See application file for complete search history.

(56) References Cited

U.S. PATENT DOCUMENTS

| 2,904,429 | A | * | 9/1959 | Schonfeld | ............. | 420/2 |
| 2,993,850 | A | | 7/1961 | Soodak et al. | | |
| 3,658,644 | A | | 4/1972 | Lang | | |
| 4,393,510 | A | | 7/1983 | Lang | | |
| 2004/0062340 | A1 | * | 4/2004 | Peterson | ............. | 376/383 |

* cited by examiner

*Primary Examiner* — Jack W Keith
*Assistant Examiner* — Marshall O'Connor
(74) *Attorney, Agent, or Firm* — Craig M. Stainbrook; Stainbrook & Stainbrook, LLP (57) ABSTRACT

A lightly hydrided/deuterated metallic plutonium-thorium fuel for use in a fast fission pool-type nuclear reactor cooled with liquid metal coolants, including lithium-7 lead eutectic, lead bismuth eutectic or lead. When so used, plutonium-239 is consumed, and merchantable heat is produced along with fissile uranium-233, which can be denatured with uranium-238 and used in light water reactors as fuel.

3 Claims, 4 Drawing Sheets
(3 of 4 Drawing Sheet(s) Filed in Color)

SPECIAL THORIUM-PLUTONIUM HYDRIDES FOR FAST TREATMENT REACTOR

CROSS REFERENCES TO RELATED APPLICATIONS

This application claims the benefit of the filing date of U.S. Provisional Patent Application Ser. No. 61/151,816, filed Feb. 11, 2009.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

SEQUENCE LISTING

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to a destructive method of disposing of unwanted legacy nuclear materials: surplus weapons grade plutonium and reactor grade plutonium, specifically. More particularly, the invention involves a thorium-plutonium-hydride fuel used with lead or lead alloy coolants in a fast spectrum reactor. Still more particularly, the invention relates to a lightly hydrided/deuterated metallic plutonium-thorium fuel for use in a fast fission pool-type nuclear reactor cooled with liquid metal coolants, preferably including lithium-7 lead eutectic, lead bismuth eutectic or lead. Plutonium-239 is consumed, and merchantable heat is produced along with fissile uranium-233, which can be denatured with uranium-238 and used in light water reactors as fuel.

2. Discussion of Related Art Including Information Disclosed Under 37 CFR §§1.97, 1.98

The general principles governing epi-thermal and fast spectrum nuclear reactors are well known in the art. In the earliest years of the nuclear era, nuclear physicists, chemists, and engineers noted that fast spectrum reactors have advantages over thermal-spectrum nuclear reactors. The neutron capture cross sections of elements used as structural, coolant and cladding materials for the reactors (generally elements bearing atomic numbers 11 to 83) are significantly smaller in the harder energy spectra than in the thermal spectrum. Further, no neutrons are lost by hydrogen capture to light water. U.S. Pat. No. 2,993,850, to Soodak, et al (issued Jul. 25, 1961) teaches that parasitic neutron capture is significantly reduced in fast reactors, and therefore a much greater neutron economy is achievable when the reactor is designed for the fast neutron spectrum.

Linton Lang conceived of a fast breeder reactor intended to produce "clean" uranium-233 (uranium-233 without co-produced uranium-232). U.S. Pat. No. 3,658,644, to Lang, discloses a fast breeder reactor designed to produce clean uranium-233, wherein the fuel production and power functions are separated in the reactor design. The fast reactor shown obtains its power mostly from fast fission of the fissile material in the fuel. The '644 patent teaches a moderator partition demising the power production region of the central core of the reactor from a thorium-containing blanket on the other side of the partition. The purpose was to eliminate most of the energetic fission neutrons and those neutrons having sufficient energy to produce n, 2n reactions with the thorium blanket. The moderators suggested for the inventive partition included zirconium hydride and lithium-7.

U.S. Pat. No. 4,393,510, to Lang, et al, discloses a light water reactor and a process to produce uranium-233 with less than 10 parts per million of uranium-232. The patent teaches that the production of uranium-232 in uranium-233 can be suppressed by separating a thorium-232 reactor blanket from the nuclear fuel using a moderator partition that reduces the energy of the incident neutrons below an energy threshold of 6 million electron volts (6 MeV). The importance of the teachings in the '510 patent resides in the fact that uranium-232, when present in concentrations over 10 parts per million, makes fuel unfit for glove-box handling as the gamma radiation from thallium-208 is too high for worker safety. Of equal importance in the teaching is the fact that the amount of co-produced uranium-232 is a function of the number interactions between thorium-232 atoms and neutrons that have energy exceeding 6 MeV. Significantly, however, the '510 patent deals with the use of a water cooled reactor, a thermal spectrum reactor, and not a liquid metal cooled reactor, as employed in the present application.

Another early patent, U.S. Pat. No. 2,904,429, to Schonfeld, discusses means and methods to fabricate binary alloys of thorium and plutonium and shows that when thorium atoms constitute 85% or more of the binary thorium-plutonium alloy, the compound possesses a face-centered cubic crystalline structure that is stable at elevated temperature. When the percentage of thorium exceeds 85%, the binary alloy is stable at temperatures exceeding 900 degrees C. The '429 patent shows that a plutonium-thorium compound is an excellent metallic nuclear fuel.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

Well designed and properly managed light water civilian reactors presently produce electricity safely and reliably. However, reactor-grade plutonium, americium, curium and neptunium from spent light water fuel must be secured. Surplus weapons-grade plutonium must be secured to manage geopolitical risks associated with weapons proliferation. Fissile plutonium-239 has a half life of 24,110 years and decays to uranium-235, a fissile material that has a half life of 700 million years. The present invention discloses a method for the destruction of plutonium-239 in weapons grade form and in reactor grade form with its associated transuranics, neptunium, americium and curium.

The present invention also provides a method that efficiently destroys both weapons-grade and reactor grade plutonium associated with transuranics. Plutonium is alloyed with thorium and doped with modest but computationally engineered amounts of hydrogen and/or deuterium to make a reactor fuel that destroys undesirable plutonium isotopes and other transuranic isotopes by fission and transmutation. The percentage of the constituents of the thorium-plutonium-hydride fuel alloys found allows for the efficient destruction of plutonium. The fission must be undertaken in the fast spectrum or the hard neutron spectrum. This is accomplished by the use of lead alloys as coolants. The leading choices for coolant are lithium-7 lead eutectic, lead bismuth eutectic and lead coolants. The metallic thorium-plutonium-hydride fuels function with stability for a deep burn only in hard spectra.

The present invention therefore includes, in the first instance, a greatly improved plutonium thorium binary alloy that includes the addition of hydrogen species (protium and deuterium) in computationally engineered amounts, wherein the percentage of thorium in the alloy exceeds 70% and the balance is plutonium, either in weapons grade form or in reactor grade form.

Extensive computational studies and analyses directed by the presented inventor revealed that a lightly hydrided/deuterated thorium-plutonium metal fuel worked remarkably well for the disposition of weapons grade plutonium with the ratio of thorium atoms to hydrogen and deuterium atoms being approximately 10:1:1, 10 Thorium, 1 Protium, and 1 Deuterium, and the power setting of the reactor was 400 megawatts thermal. These studies showed that higher hydrogen species doping of the fuel resulted in unsatisfactory performance because the rate of neutron multiplication quickly fell below critical in those cases in which the ratio of thorium to hydrogen was 1:2 and when the ratio of thorium to deuterium and hydrogen was 2:1:1. When no hydrogen was present in the fuel, on the other hand, the rate of neutron multiplication rose above criticality at too high a rate for stable reactor operations.

From the analysis conducted to date, it appears that a hydride doping between 8:1:1 (8 Thorium:1 Deuterium:1 Protium and 30:1:1 (30 Thorium:1 Deuterium:1 Protium) is the ideal range for nuclear fuel designed for the disposition of weapons grade plutonium. The optimal ratios of atoms of thorium to atoms of hydrogen species varies as a function of the different output powers for the reactor and thus different sized cores.

For reactor grade plutonium the best mix of thorium is between approximately 75% and 85% thorium, ideally between 78% and 82%, with the rest reactor grade plutonium. When neither protium nor deuterium are present in this fuel alloy, the fuel functions well for long periods, i.e., more than 2000 days. When reactor grade plutonium is combined with minor actinides in the same ratio as are produced in light water fuel during operations, and when the ratio of thorium to hydrogen atoms is 5:1 at a power setting of 400 Megawatts, the thorium transuranic fuel lasts for 1000 days. This quantification forms the basis for the invention and allows the transuranics to be consumed as a group without having to separate the neptunium, americium, and curium from plutonium in spent light water fuel. The useful ratio of thorium atoms to hydrogen atom is between 4:1 and 8:1, again depending on the power of the reactor.

The present invention therefore provides a new nuclear fuel for use in conventional fuel rods in a novel pool-type rector cooled with depleted lithium lead eutectic, lead bismuth eutectic or lead. The innovation has been computationally modeled, and where hydrogen species doping is modest, the neutron spectrum is energetic enough to fission plutonium-240 and neptunium-237 and to transmute americium and curium from spent light water fuel. The same type of reactor efficiently destroys weapons-grade plutonium-239 in which case the doping of the fuel with deuterium and protium is more modest.

Because of its unique capability, the inventive reactor is called a "Special Fast Treatment Reactor (or "SFTR"). The SFTR is a simple modular pool-type reactor in which the metallic thorium-plutonium-hydride fuel is cooled by liquid lead, lead bismuth-eutectic, or depleted lithium-7-lead eutectic. This achieves a spectrum that efficiently fissions surplus plutonium and produces uranium-233. The SFTR is a simple pool type fast reactor design that operates at atmospheric pressure in an enclosed vessel. It is passively safe and has a minimum number of moving parts. The thorium/plutonium/hydrogen species reactor fuel is enclosed in an array of fuel rods clad with HT-9 or EP 823 stainless steel. The fuel rods are surrounded by spectrum shaping rods comprising hydrided or deuterated thorium and by metallic thorium reflector rods that are clad with the same stainless steel used for the fuel rods and the stainless steel jacket retaining the liquid metal pool. The fuel rod array is submerged in liquid lithium-7-lead eutectic, lead or lead-bismuth eutectic, two preferred liquid lead eutectic coolants with natural lead being the third choice. The lead in solid or liquid form metal scatters and conducts neutrons well without moderating them and without capturing them. This permits good neutron communication among the fuel rods, which can therefore have a larger diameter than those in light water reactors because the metal fuel transports heat well and the metal fuel is bonded to the cladding with the same heat conducting lead alloy that used outside of the cladding.

Importantly, the SFTR transmutes and fissions reactor grade neptunium, plutonium, americium and curium without needed to separate the transuranic group from each other before the plutonium is alloyed with thorium and hydrogen. Thus, many of the troublesome transuranic isotopes can be permanently destroyed as a group. The invention therefore obviates the need for facilities that separate plutonium from spent nuclear fuel and long term plutonium storage facilities. The invention relieves concerns about geopolitical risks, environmental risks and stewardship costs associated with storing plutonium in weapons grade form or in reactor grade form or as irradiated MOX fuel. Use of the invention fissions away the undesirable materials.

The inventive fuel produces uranium-233 during operations in the liquid lead environment. This makes isotopic separation facilities for enrichment of natural uranium to make nuclear fuel obsolete. The SFTR produces uranium-233 that can be used as the fissile component in all nuclear fuels in place of uranium-235. The produced uranium-233 can be denatured with uranium-238 to comply with pertinent global non-proliferation standards. Since uranium-232 is coproduced with uranium-233 in the hard neutron spectrum, the fuel produced in the SFTR will have little attraction for weapons purposes by nation states because the gamma radiation emitted from thallium-208 (in the decay chain starting with uranium-232) gives away the location of the uranium-233 produced in the SFTR. This in addition to denaturing with uranium-238 makes a better more proliferation resistant nuclear fuel for use in the world's civilian fleet. Additionally the presence of the gamma radiation from the decay of thallium-208 makes close working of the uranium metal impractical because exposure to a lethal dose of radiation does not take a long time. These factors could limit interest from sub-national groups interested in using fissile uranium-233 containing small amounts of uranium-232 for illicit radio toxic or explosive purposes.

In operation, the SFTR conserves surplus neutrons from fission of plutonium by transmuting thorium into uranium-233. Uranium-233 can be blended with fertile uranium-238 or with fertile thorium-232 (or both) for use as nuclear fuels in existing and future nuclear power stations. Accordingly, the infrastructure needed for enrichment of natural uranium by isotopic separation of uranium-235 is no longer needed to produce fuel grade uranium, since uranium-233 is produced in abundance during SFTR operations with its general production matching the weight of plutonium-239 destroyed.

After plutonium and the undesirable transuranics are fissioned in the SFTR, they cease to exist, and, thus, no longer pose an intractable storage problem. Long-term underground storage is not necessary for the plutonium and associated transuranic group that is fissioned away. Long term underground storage is also unnecessary for the recovered and recyclable uranium-238 from light water fuel or other sources, which can be blended with the uranium-233 that is produced in the SFTR and can be used as fuel in present and future reactors.

From the foregoing, it should be clear that the inventive system obviates the need for long term storage of weapons grade plutonium, reactor grade plutonium and obviates the need for energy consumptive industrial facilities dedicated to the enrichment of uranium fuels with fissile uranium-235.

Each SFTR reactor produces 400 megawatts of thermal energy for sale to electric power generators, and "fresh" nuclear fuel in the form of grade uranium-233 (to be blended with uranium-238 as needed) for use in existing light water reactors or other advanced reactors that breed fuel continuously and use thorium.

These benefits are all provided by the stable nuclear fuel disclosed herein. The fuel is used with liquid lead alloys to assure a fast spectrum. The fast spectrum fissions neptunium-237 and plutonium-240. As disclosed above, when reactor grade transuranics are included as a group and combined with thorium, the doping of the alloy with protium is relatively light. For this combination of materials the ratio of thorium atoms to hydrogen atoms in the fuel is 5:1 when reactor power is 400 megawatts. When reactor grade plutonium is separated from spent light water fuel and combined with thorium there is no need to dope with hydrogen for a core having a power of 400 megawatts. When the plutonium is substantially all plutonium-239 as is the case with weapons grade plutonium, the best results reveal that the ratio of thorium to deuterium and protium is 10:1:1 for a power of 400 Megawatts. If the reactor is scaled for more power or less power the optimum ratio will vary so that the fuel should be treated with hydrogen species so that the ratio is richer in hydrogen species when the core volume and power are scaled down and that the ratio is leaner in hydrogen species when core volume and power are scaled higher.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Those skilled in the art will appreciate that the conception upon which this disclosure is based may readily be used as a basis for designing other structures, methods, and systems for carrying out the several purposes of the present invention. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there are illustrated the preferred embodiment.

BRIEF DESCRIPTION OF THE FIGURES

The instant application contains three drawings executed in color. Copies of this patent or patent application publication with color drawings will be provided by the Office upon request and payment of the necessary fee.

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
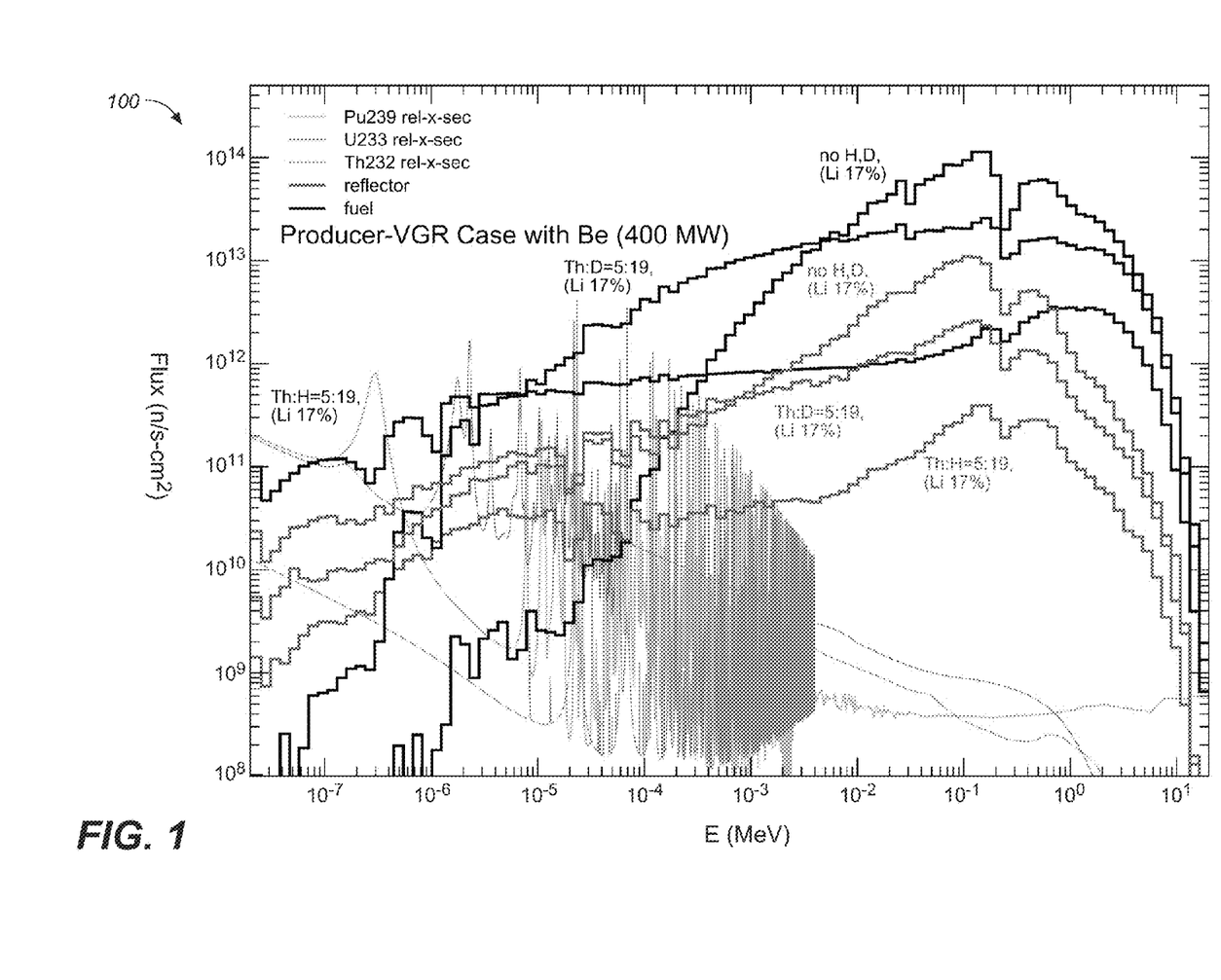
FIG. 1 is a chart of three "in-fuel" neutron spectra and three "in-reflector" spectra: one case with protiated fuel, a second deuterated fuel and a third without either hydrogen species. The coolant is depleted lithium-lead eutectic consisting of 83% lead and 17% lithium-7 by atomic ratio. The hardest spectrum depicted is the one lacking hydrogen species in the fuel. Also shown in the chart are the neutron capture cross sections for thorium-232, uranium-233 and plutonium-239.

Referring first to FIG. 1, there is shown a chart 100 illustrating the in-fuel and in-reflector spectra of three types of reactor fuel. The coolant for this chart is depleted lithium-7 lead eutectic, with lithium-6 entirely excluded. The hardest spectrum is labeled as the "no H, D" case in which liquid lead was selected as the coolant. The intermediate spectrum is the deuterium case in which the metal fuel was doped with deuterium. The softest spectrum is the hydrogen case. For the two hydrogen species, the ratio of metal atoms to gas atoms in the fuel is 5:19. The hardest spectrum using the lead lithium-7 coolant is superior because it peaks near 0.24 MeV; so that most of the neutrons are energetic enough above the neutron capture resonances of thorium to maximize production of uranium-233. These thorium neutron capture resonances are also near but above the neutron spectrum energy levels at which uranium-233 and plutonium-239 have good fission cross sections. The six spectra are shown with the neutron capture cross sections of thorium, uranium-233 and plutonium-239 and the flux. Three spectra are "in-fuel" and three are "in-reflector" The information from this diagram was developed using Monte Carlo N-Particle Transport Code ("MCNP").

The plot of FIG. 1 shows that protium provides a "supersoft" thermal neutron spectrum in the 3.9% thorium enrichment case with plutonium-239, and an epi-thermal spectrum in the 7.9% thorium enrichment case with plutonium-239 when deuterium is used. The hardest, most energetic spectrum occurs when the fuel is modeled without hydrogen or deuterium. For this case the thorium enrichment with plutonium-239 is 8.3%. Greater mass of fissile and fissable transuranics are present fuels where moderation by hydrogen species is not present. The largest resonance for neutron capture by thorium nuclei ranges from an energy of approximately 50 eV in the epi-thermal range downward to approximately 15 eV. In all cases uranium-233 fuel production takes advantage of the neutron capture resonances of thorium within this range of neutron energies. The graph also includes a line relating to the "super soft" spectrum. This shows that an abundance of thermal neutrons forms when the fuel is moderated primarily with protium (Th:H, 5:19.) This super soft spectrum is produced by the 3.9% plutonium-239 enrichment of the thorium metal fuel. The softness of the spectrum also significantly reduces the amount of uranium-232 co-produced with uranium-233 during operations. This spectrum is useful for producing uranium-233 without co-production of significant amounts of uranium-232 but it tends to be greatly influenced by the presence of fission products, so that the time period that k-eff exceeds one is comparatively brief. This fuel is over hydrided and was computationally found to be unsatisfactory because its useful life is predicted to be much too short.

Figure 2:
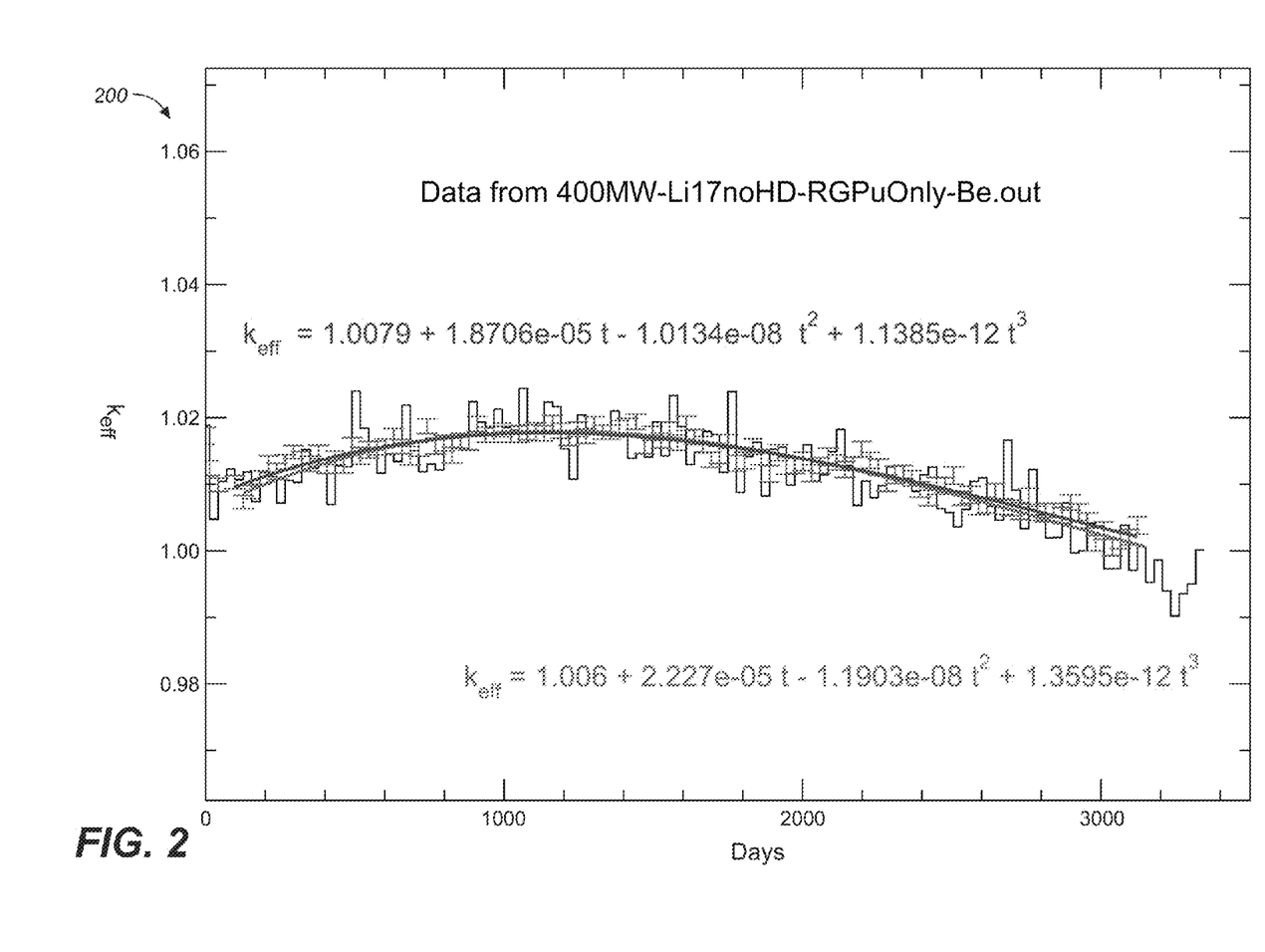
FIG. 2 is a graph of the $k_{eff}$, the neutron multiplication factor of the neptunium-plutonium-thorium fuel enriched to 1.2% nepturnium-237, 8.3% plutonium-239, with other transuranics in reactor grade proportions over a ten year run in which lead lithium-7 eutectic is used as the coolant.

FIG. 2 is a chart 200 showing the results of a computationally simulated ten year run. The power was set at 400 megawatts thermal; the fuel is metallic thorium enriched with fissile reactor grade transuranics. Specifically, neptunium-237 is 1.2% of the mass and plutonium-239 is 8.3% of the fuel mass. The neutron multiplication rate increases for approximately one thousand days and declines thereafter to 1 after two thousand additional days. The beginning of life k-eff is approximately 1.01. It approaches 1.02 at the end of the first thousand day period and declines very gradually thereafter over a two thousand day period.

The study documented in FIG. 2 demonstrates the stability of the fissile transuranic-thorium fueled system over a decade of operations. Notable is the gradual change in k-eff between 1.01 and 1.02 and back again to 1 over a long period. This supports the proposition that hydrogen doped plutonium thorium fuel fissioned in the liquid metal environment will allow for a long deep burn of the plutonium fuel when active control measures reduce the variation in the k-eff over time. Traditional methods of neutron capture can be used to actively control the neutron multiplication rate during reactor operations.

Figure 3:
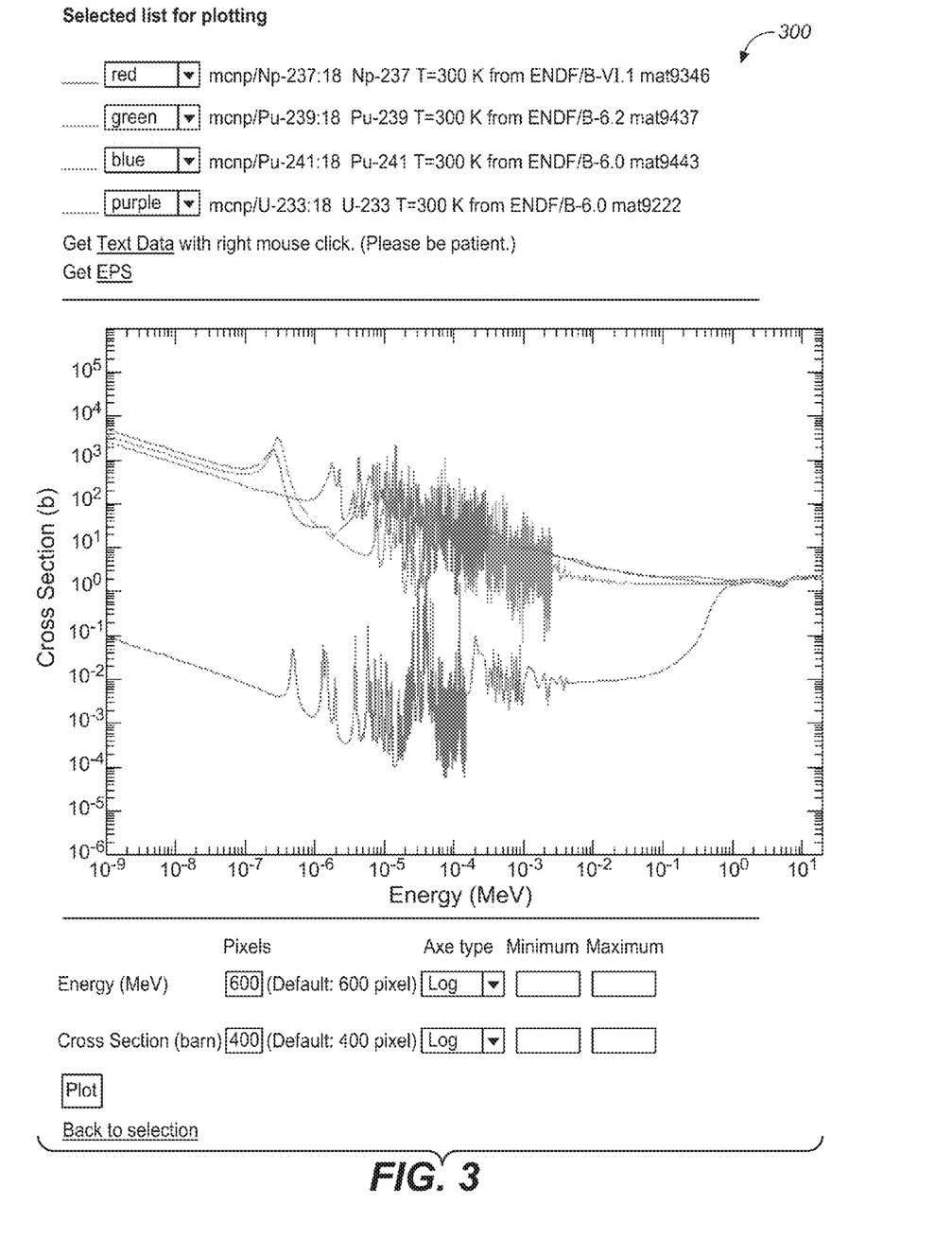
FIG. 3 is a plot showing the fission capture cross sections of uranium-233, plutonium-239 and plutonium-241.

Referring next to FIG. 3, there is seen a chart 300 showing the fission capture cross sections of uranium-233, plutonium-239 and plutonium-241. These are the leading fissile isotopes in the fuel. These isotopes capture neutrons within complementary ranges easing control issues. The major fissile isotopes for this reactor do not include uranium-235. Plutonium-240 is provided for reference purposes. The fission cross section broadens from ten barns to over one thousand barns over energy range from approximately 6 thousand electron volts to approximately one-tenth of an electron volt. As long as the spectrum stays harder than ten thousand electron volts or one hundredth of a MeV, and leakage is promoted by passive reactor effects the conceptual core seems to exhibit satisfactory stability that can be fine tuned with conventional methods, neutron absorption rods.

Stainless steel is used for the cladding that contains the metallic fuel and separates the fuel and the fission products from the liquid metal coolant. HT-9 or EP-823 has good attributes for both cladding and for structural members, the jacket of the liquid metal pool. These similar stainless steel alloys have good resistance to the energetic and high neutron flux of the core region and to heat. These stainless steels are compatible with a variety of the liquid metal coolants: lead, lead bismuth eutectic, lead lithium-7-eutectic or tin-lead eutectic, and so forth. The exterior of the stainless steel plates or rods function to confine the nuclear fuel and the fission gasses and fission products produced during reactor operations.

The fuel and reactor are designed to fission plutonium extracted from spent light water reactor fuel or from obsolete weapons. Transuranic reactor grade isotopes of plutonium and neptunium and associated americium and curium or weapons grade plutonium by itself or blended with reactor grade plutonium are alloyed with thorium in computationally optimized proportions and placed in the fuel rods as rolled foil, compacted metal wool or as sintered metal alloy powder. The bonding for the metal fuel under the cladding that assists heat transport is the same lead alloy used as for the coolant on the other side of the cladding.

As another option, the thorium-plutonium fuel may be further alloyed with lithium-7, magnesium or aluminum and computationally optimized in a metallic form to enhance fuel expansion effects and homogenous moderation effects when hydrogen species are introduced into the fuel at computationally optimized ratios. Natural lithium and/or lithium-6 could be added to the fuel matrix as beneficial burnable poisons to assist in the control of the reactivity of the reactor over long time periods.

The various alloys employed in the preferred embodiments for use in the fuel rods have relatively good heat conduction characteristics that are improved with the addition of lithium-7, aluminum, and/or magnesium. Lithium-7, aluminum, and magnesium all have low neutron capture cross sections in the fast spectrum. However, lithium-7 is preferred as it moderates the hard spectrum modestly and has the lowest neutron capture cross section. Aluminum and magnesium can be added to the thorium transuranic alloy to enhance temperature expansion and heat transfer effects. Lithium-6 can be added to the fuel composition as a burnable poison.

The ratio of thorium to reactor grade or weapons grade plutonium in the fuel preferably ranges from 19Th:1Pu, 5% plutonium to 95% thorium, to 3Th:1Pu 30% plutonium 70% thorium. The optimal metallurgical mix for the thorium-plutonium alloy is 3 parts plutonium to 17 parts thorium, 15% plutonium 85% thorium. The percentages are measured by the proportion of atoms, the atomic ratio. The most important additive is hydrogen species. For weapons grade disposition the ideal ratio is approximately between 8-12 Thorium atoms to 1 deuterium atoms and 1 protium atom for a 400 Megawatt power setting. For reactor grade plutonium associated with spent fuel transuranics as they are found in spent fuel the ideal ratio is approximately between 4-6 Thorium atoms to 1 protium atom for a 400 Megawatt power setting, the precise ratio being governed by the intended application. To this alloy the lithium-7, aluminum, magnesium fractions can be added sparingly, not in excess of a total 10% by atomic ratio, so that the final fuel alloy is optimized for long service. The neptunium and the minor actinide isotopes, americium and curium isotopes may also be present in their reactor grade proportions obviating the need to separate these from spent nuclear fuel.

In all of the fuel rods, fission gasses migrate to the plenum space to minimize neutron capture in the fuel zone where reactivity is to be maintained at the highest levels. By having the fission gasses migrate to the plenum space at the top of the rod and decay in the plenum above a stainless steel mesh, the fuel and thus power output from the core will be less influenced by xenon transients and by the build up of fission products.

Large plenum space in the fuel rods are used to gather disruptive fission gasses and to promote negative reactivity caused by the departure of hydrogen species in fuel hydrides as fuel temperatures exceed pre selected temperature thresholds. For the hydrided fuels the fuel is homogeneous. Moderation although slight takes place in the fuel because hydrogen species are present. If a temperature threshold of 883 degrees C. is exceeded in the fuel, the hydrogen species will dissociate from thorium and enter the plenum space. Because the moderator density is reduced, fewer thermal neutrons will be available to sustain the immediately preexisting rate of neutron multiplication. The rate will decline until temperature in the fuel drops below 883 degrees C. at which point the hydrogen can be reabsorbed by the metallic thorium. As a note, the hydrogen will already have disassociated from plutonium and uranium in the fuel because the dissociation point of these hydrides and deuterides is much lower.

The reactor also makes use of spectrum shaping rods. These contain thorium hydride or thorium deuteride and like the fuel rods have large plenum volumes. Neutrons are moderated by the hydrogen species in the spectrum shaping rods until temperature in the liquid metal coolant is elevated to above 883 degrees C. at which time the hydrogen disassociates from the compound. When the spectrum shaping rods are used the loading of the fuel with hydrogen species can be reduced.

Figure 4:
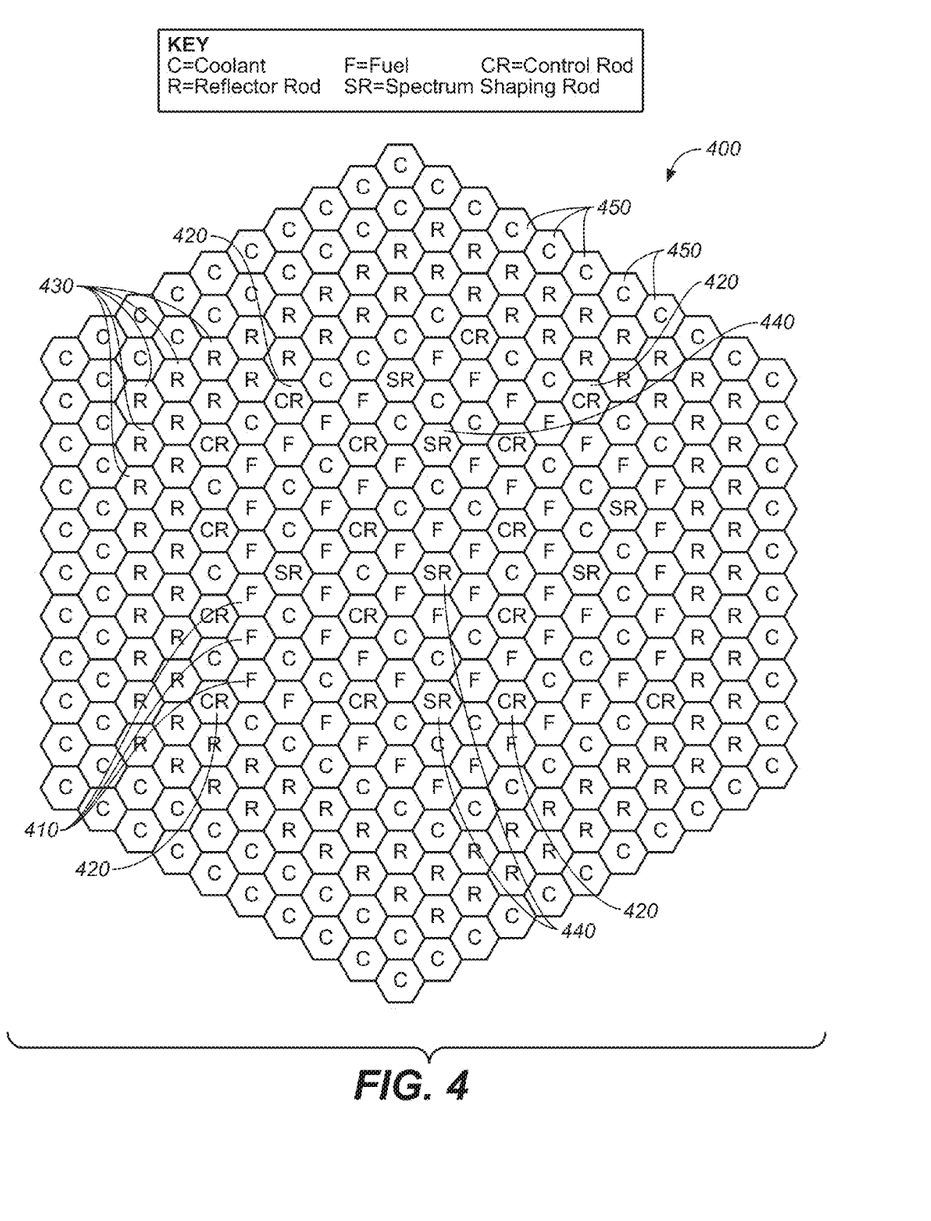
FIG. 4 is a schematic cross-sectional top plan view showing the geometrical configuration of the fuel rods, control rods, spectrum shaping rods, and reflector rods disposed in the reactor core.

Practical and simple reactor embodiments use fuel rods arrayed in geometries well known to the art. Referring now to FIG. 4, there is shown in schematic cross-sectional top plan view a preferred embodiment of the rod and coolant geometry used in the reactor core of the present invention. The rods include fuel rods 410, control rods 420, reflector rods 430, and spectrum shaping rods 440, disposed in bundles of 3, 7, or 19, and these are immersed in the selected liquid metal coolant 450. In a preferred embodiment, the rods are arrayed in either in concentric rings or in rows and columns with the fuel rods and shaping rods on the inside and the reflecting rods on the outside. Control is maintained and achieved in the rod system by using traditional neutron absorbing rods and by spectrum shaping rods of thorium hydride to soften the spectrum. In the preferred embodiment, thorium hydride is selected to thermalize some of the fast neutrons to maintain the chain reaction. As liquid metal temperature crosses a threshold, the metal hydride disassociates reducing moderator density. The hydrogen gas is trapped in the spectrum shaping rod plenum above the neutronically active region of the core. This system is expected to be semi-autonomous with the hydride providing an automatic line of defense. Traditional control measures are used, as control rods and safety rods of neutron absorbing materials are deployed and introduced into the neutronically active region to increase or reduce the rate of neutron multiplication and to shut down or start up the reactor.

It will be appreciated, then, that control of the inventive spectrum shaping system is provided passively by the dissociation of hydrogen from thorium in the spectrum shaping rods and the thorium in the fuel rods. Generally, when the thorium hydride spectrum shaping rods are removed or are above 883 degrees C. the system is under moderated and the rate of neutron multiplication declines markedly. Depending on the hardness of the spectrum, hafnium, tungsten, tantalum, niobium can be used for the fast and epi-thermal spectra for neutron absorbing safety rods and control rods in embodiments where solid metal performs the safety control functions.

Vertical movements of the control rods assist and reinforce the passive and Doppler effects, fuel expansion effects, and moderator density change effects combine to promote safety during operations. In the inventive system, passive control factors are also maximized.

Control Features:

In the intermediate energy neutron spectrum, lightly hydrided reactor grade or weapons grade plutonium alloyed with fertile thorium fissions predictably for reasonably long time periods as fuel expansion effects, neutron leakage effects and Doppler broadening effects are well managed to maximize passive controls over the neutron multiplication rate.

Control over the neutron spectrum is accomplished by the selection of the proportion of protium or deuterium combined with the fuel in the fuel rods and in the spectrum shaping rods, and by the selection of the lead-containing liquid metal coolant alloy. For neptunium-237 to fission, the hardest spectrum must be present. For this purpose the preferred coolant is lead depleted lithium eutectic and the fuel is lightly protiated. This metallic fuel is the preferred embodiment for reactor grade plutonium with associated transuranics because the neutron multiplication rate stays slightly super critical for a simulated computation run time of over 1000 days. The lithium-7 lead eutectic with metal thorium-transuranic fuel has the most stable k-eff discovered so far. For the destruction of weapons grade plutonium the lightly deuterated and hydrided thorium-plutonium metallic fuel alloy is the first choice. During a 2000 day period of operations the reactor's k-eff, the neutron multiplication factor, remains above one increasing at the beginning of life for the first thousand days and declining slowly thereafter.

The fast spectrum brings with it the advantages of longer core life and deeper burning because the neutron capture cross section of the fission products is reduced in the higher energy ranges in comparison to the lower energy ranges. Traditionally control and safety have been more difficult to achieve in the fast spectrum than in the thermal spectrum with a large core. However, active features using movable spectrum shaping rods, moveable reflector rods allow the population of thermalized neutrons to be reduced when liquid metal temperature is high. When the reflector rods are retracted and removed more neutrons leak out of the core. When the spectrum shaping rods are retracted and removed fewer neutrons are thermalized. Passive features also assist operations. Neutrons will be absorbed by thorium atoms in the reflector rods, in the shaping rods and in the fuel when fuel and coolant temperature is high because of Doppler effects. Doppler broadening effects are more pronounced in the mid energy ranges because of the resonance regions of thorium's neutron capture spectrum. Fuel expansion effects in metallic fuel are more pronounced in the higher temperature ranges because expansion of the fuel causes significantly fewer fissile atoms to be present in cubic centimeter unit volumes when the fuel is operating at mid-range temperatures.

From the foregoing, it will be appreciated by those with skill that there are three aspects promoting negative reactivity in this reactor. The first is the neutron spectrum energy at which thorium is most likely to capture neutrons. The rate of neutron capture and thus the rate of uranium-233 fuel production are influenced by the energy of the neutron population in proximity to the nuclei of thorium. In the higher end of the epi-thermal spectrum, probabilities for capture by thorium are the highest. The spectrum of the active neutron population in this reactor is made to exceed this optimal energy level through the use of lithium-7 in the coolant, the bond in the fuel and the use of spectrum shaping rods containing deuterated thorium.

The second aspect promoting negative reactivity involves Doppler broadening effects. The neutron capture cross section diagrams that depict the probabilities of neutron capture by thorium at various neutron energies has specific energies at which the probabilities for neutron capture vary markedly. When temperatures are elevated, the metal atoms move more energetically and this movement "blurs" the peaks and valleys of the capture resonances. As the temperature increases in the thorium metal alloy in the fuel rods, in the reflector rods, Doppler broadening effects cause the resonances to smear together favoring and enhancing neutron capture by the thermally excited nuclei. The Doppler broadening effects compliment active controls by reducing the neutron population when fuel is hot.

The third aspect promoting negative reactivity is the fuel expansion effect. Heated atoms of the metal matrix when in full operation occupy a larger volume than atoms of the matrix when at the mid range of operations. This provides fewer fissile nuclei per unit volume of fuel matrix, giving hot fuel fewer fissile nuclei for neutrons to collide with than they would encounter in cold fuel. Fuel expansion effects compliment other control features by decreasing fission captures per unit of volume when fuel is hot. Fuel expansion effects are enhanced by the addition of lithium, aluminum and/or magnesium to the fuel matrix. This is augmented by spectrum hardening effects following reduction of moderator density.

This reactor has two fuel configurations. The first configuration uses weapons grade plutonium and thorium, the second uses reactor grade plutonium and the associated transuranics, neptunium, americium and curium and thorium. Destruction of plutonium-239 over a ten year operations period is in the range of a metric ton and the production of uranium-233 over this period is slightly more than the mass of the plutonium consumed with a power of 400 megawatts.

The thorium-plutonium fuels must be hydrided to provide advantageous neutronic effects. The addition of the hydrogen species reduces the percentage of fissile material in the fuel needed in order for the core to go critical. Lightly hydriding the fuel so that ratios of metal to gas atoms range from 30 to 1 to 1 5 to 1 provide important benefits. Hydrogen species is kept in the fuel to provide a homogenous moderation effect. When temperature exceeds pre set thresholds, the fuel compound dissociates releasing the hydrogen species as a gas. This reduces moderator density in the fuel and has a direct and prompt impact on the neutron multiplication rate, reducing it as the hydrogen species migrate from the fissile or fissable isotopes in the fuel far enough so that fewer fissions occur because fewer neutrons are moderated to the low energies associated with the highest probabilities for fission capture in plutonium.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed is:

1. A clad metallic nuclear fuel alloy for use in the fast or epithermal neutron spectrum that efficiently fissions or transmutes isotopes present in spent light water reactor fuel, said nuclear fuel alloy comprising:
    75-95% fertile metallic thorium;
    5-25% reactor grade fissile plutonium and associated unseparated transuranics; and protium;
    wherein said metallic nuclear fuel alloy is enclosed in stainless steel cladding and doped with protium such that the ratio of thorium atoms to protium atoms is between approximately 6:1 and 4:1, inclusive, with the exact ratio of fertile to fissile material being a function of reactor power and such that said fuel fissions in the elevated epithermal neutron spectrum or the fast neutron spectrum and consumes and destroys plutonium-239 and other plutonium isotopes in reactor grade fissile plutonium along with the associated unseparated transuranics from spent light water reactor fuel.

2. The metallic nuclear fuel alloy of claim 1, further including deuterium, wherein the ratio of thorium atoms to deuterium atoms and protium atoms is between about 12:1:1 and 8:1:1, inclusive, such that said fuel will consume and destroy plutonium-239 in obsolete weapons grade plutonium fuel.

3. The metallic nuclear fuel alloy of claim 1, wherein the unseparated transuranic portion of the spent light water nuclear fuel includes reactor grade neptunium, plutonium, americium, or curium, either alone or in any combination thereof, wherein said metallic nuclear fuel alloy transmutes and fissions the members of the unseparated transuranic portion as a group without the need to separate the members of the transuranic group from one another before said plutonium is alloyed with said thorium and said protium.

* * * * *